United States Patent
Hong et al.

(10) Patent No.: US 7,301,912 B2
(45) Date of Patent: Nov. 27, 2007

(54) METHOD AND APPARATUS FOR DETERMINING COMMUNICATION PATH OVER NETWORK BY USING SPANNING TREE AND CIRCUIT DETECTION

(75) Inventors: Kang Woon Hong, Seoul (KR); Heyung Sub Lee, Daejeon (KR); Hyeong Ho Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 877 days.

(21) Appl. No.: 10/699,139

(22) Filed: Oct. 30, 2003

(65) Prior Publication Data

US 2004/0090926 A1    May 13, 2004

(30) Foreign Application Priority Data

Nov. 9, 2002   (KR) .................. 10-2002-0069412

(51) Int. Cl.
  *H04L 12/28* (2006.01)
(52) U.S. Cl. .................. 370/256; 370/402; 370/408; 709/238
(58) Field of Classification Search .......... 370/256, 370/402, 408; 709/238
  See application file for complete search history.

(56) References Cited

U.S. PATENT DOCUMENTS 7,061,875 B1 *  6/2006  Portolani et al. ........... 370/256

2002/0009092 A1 *  1/2002  Seaman et al. ............. 370/406

OTHER PUBLICATIONS

131 Technology White Paper, "Spanning Tree: Death is Not an Option", 9 pages, Jan. 2001.
IEEE Draft P802.1 w/D10, Information technology-Telecommunications and information exchange between systems-Local and metropolitan area networks-Common specifications-Part 3: Media Access Control (MAC) Bridges:, 2001 IEEE.

* cited by examiner

*Primary Examiner*—Seema S. Rao
*Assistant Examiner*—Wanda Z Russell
(74) *Attorney, Agent, or Firm*—Blakely, Sokoloff, Taylor & Zafman

(57) ABSTRACT

A method and apparatus for determining a communication path over a network are provided. The method involves generating a spanning tree having connection devices over a network as vertices and having links among the connection devices as edges; allotting predetermined vertex information to each vertex on the spanning tree; detecting all circuits having a plurality of communication paths among the connection devices over the network corresponding to the spanning tree; and applying rapid ring spanning tree protocol (RRSTP) to links corresponding to the detected circuits and applying rapid spanning tree protocol (RSTP) to links not corresponding to the detected circuits.

8 Claims, 12 Drawing Sheets

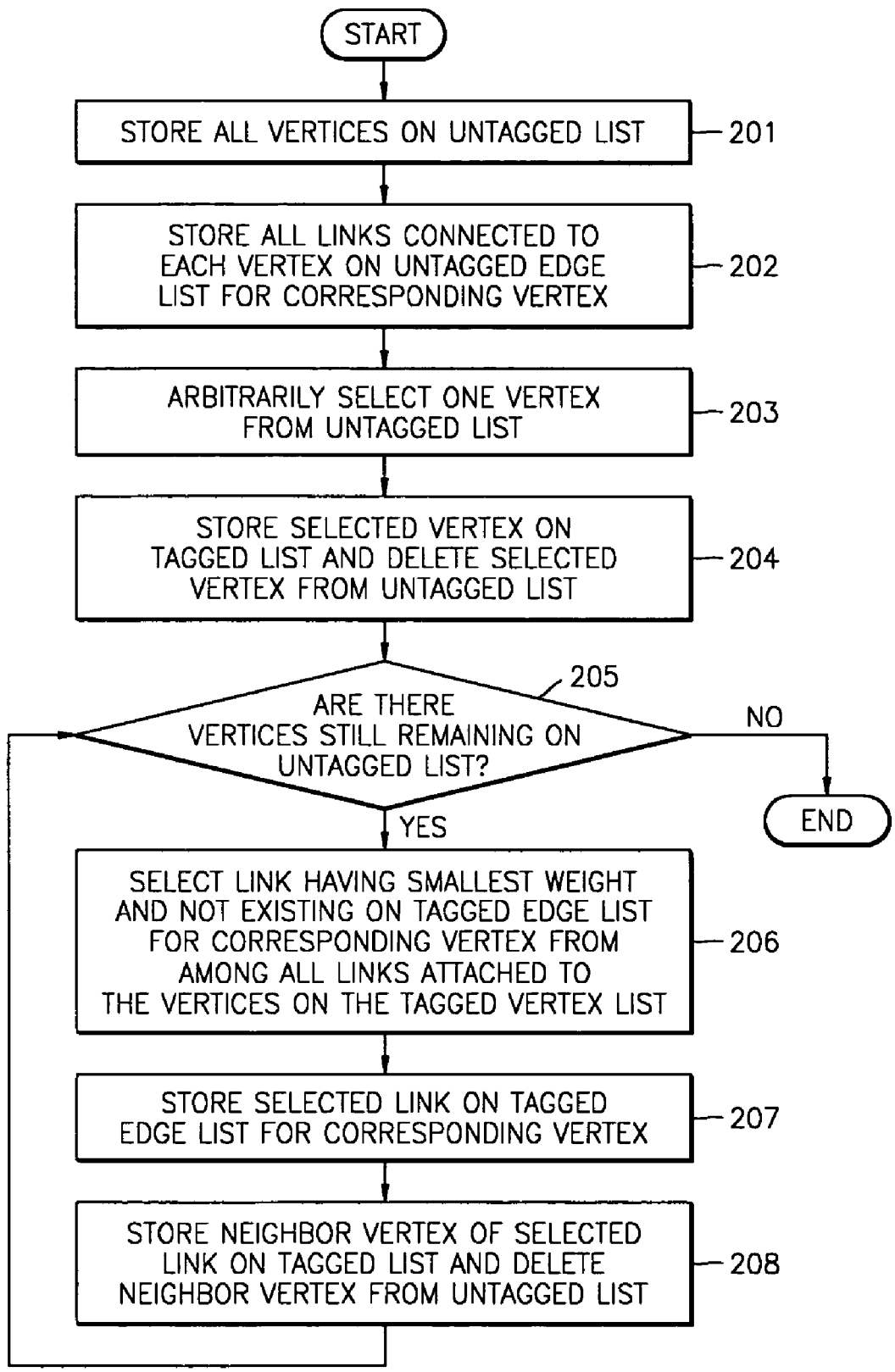

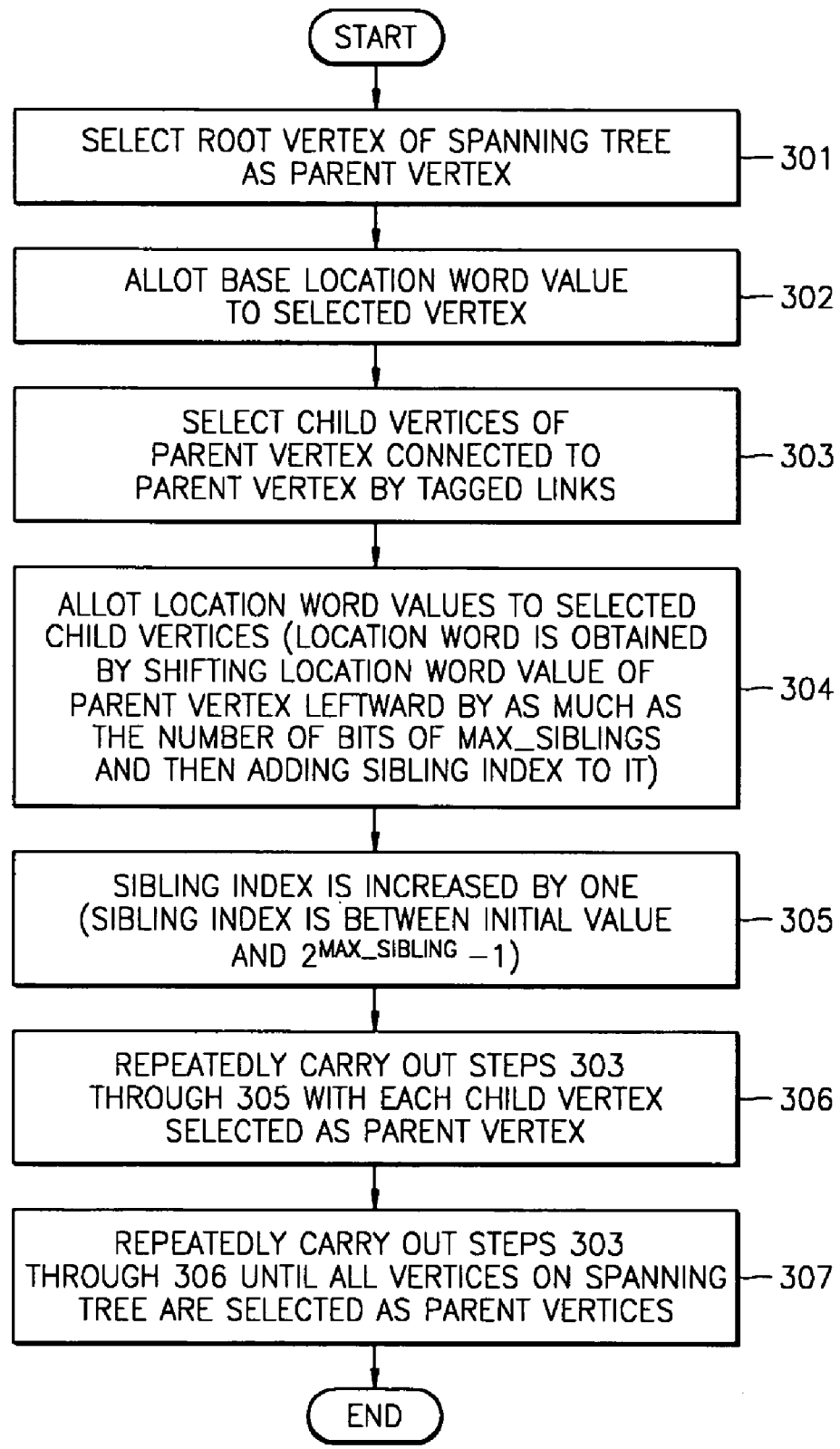

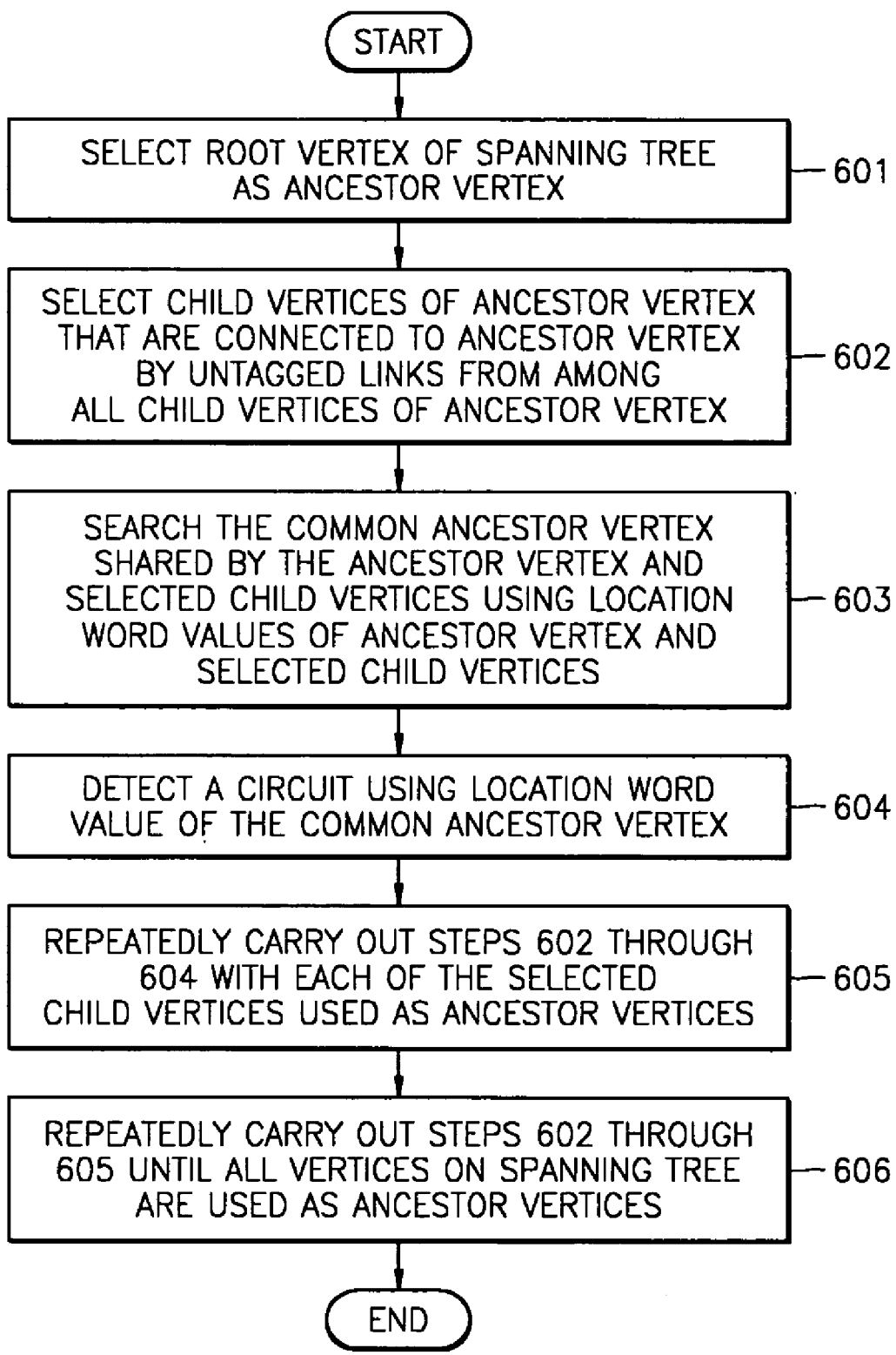

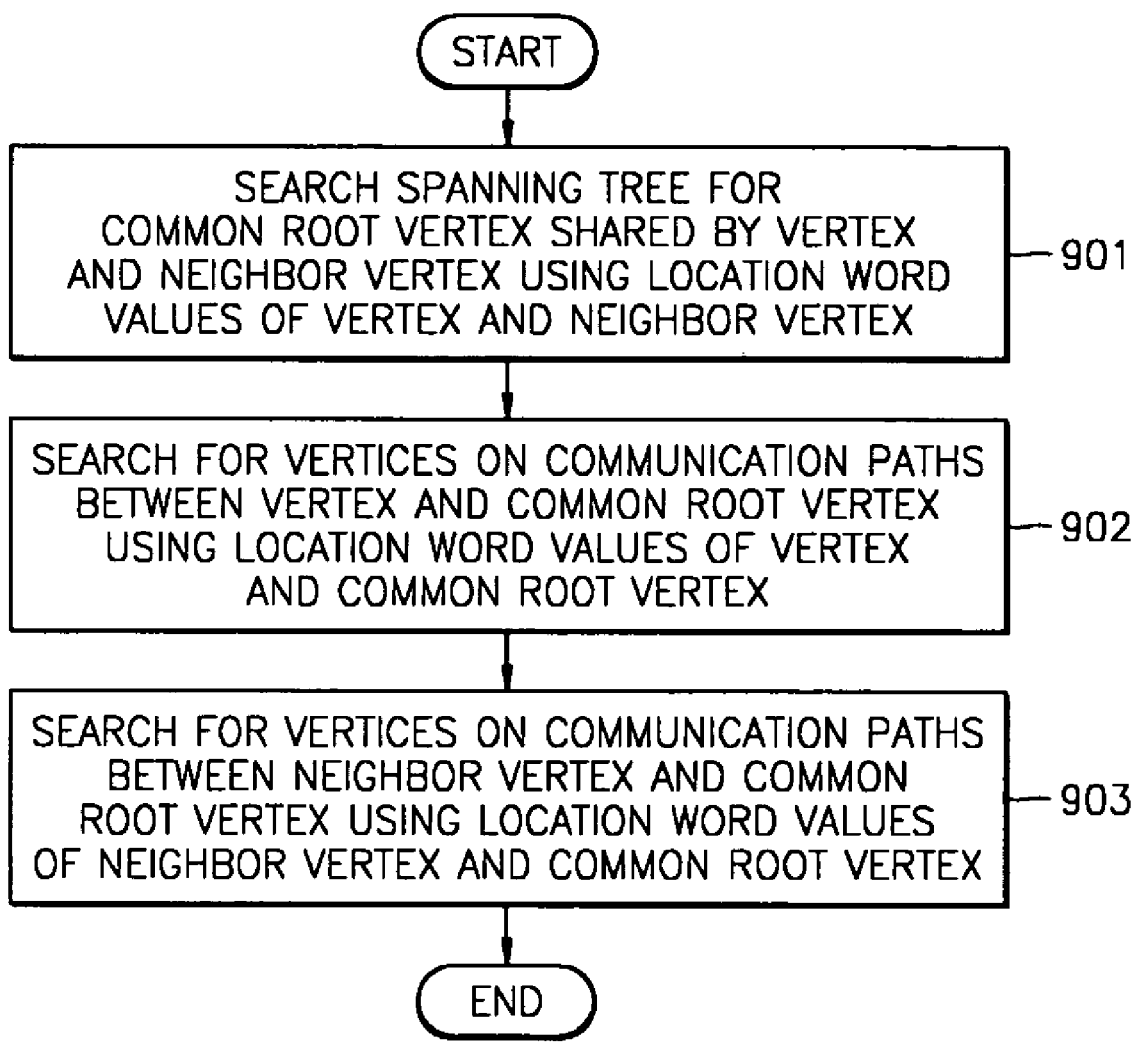

METHOD AND APPARATUS FOR DETERMINING COMMUNICATION PATH OVER NETWORK BY USING SPANNING TREE AND CIRCUIT DETECTION

BACKGROUND OF THE INVENTION

This application claims the priority of Korean Patent Application No. 2002-69412, filed on Nov. 9, 2002, in the Korean Intellectual Property Office, the disclosure of which is incorporated herein in its entirety by reference.

1. Field of the Invention

The present invention relates to a computer network, and more particularly, to a method and apparatus for determining a communication path over a network by using a spanning tree and circuit detection.

2. Description of the Related Art

Among a variety of methods of determining communication paths among a plurality of devices over a network, spanning tree protocol (STP) has been suggested as IEEE standard 802.1D in order to solve a problem of traffic loops generated by interconnecting different local area networks (LANs). STP has been generally used for solving the problem of looping using bridges over a network. In accordance with the advent of communication markets, demands for networks connecting main offices and their branch offices, customers and businesses, and businesses and businesses have been steadily growing. In this regard, STP is no longer considered effective or efficient because it cannot successfully meet those demands.

In the meantime, a spanning tree algorithm used in STP solves the problem of traffic looping by removing links that generate loops. However, this type of spanning tree algorithm has been denounced as having poor performance and being inefficient. In addition, in a network with communication paths generated by the spanning tree algorithm, some links are forced to be blocked even though they are usable, which leads to waste or, at least, inefficient use of bandwidths.

Moreover, if an error occurs on a predetermined link on a spanning tree, a communication path should be reestablished. In this case, convergence time, which generally amounts to about 30 seconds in the prior art, could be a serious setback for metropolitan area networks.

SUMMARY OF THE INVENTION

The present invention provides a method and apparatus for determining a communication path over a network by using a spanning tree and circuit detection. The method and apparatus for determining a communication path over a network, apply different protocols to a looping-contained areas and a no-looping-contained area so that they have better performance and higher efficiency.

The present invention also provides a computer-readable recording medium on which a program, enabling the method for determining a communication path over a network, is recorded.

According to an aspect of the present invention, there is provided a method of determining a communication path over a network. The method involves generating a spanning tree having connection devices over a network as vertices and having links among the connection devices as edges; allotting predetermined vertex information to each vertex on the spanning tree; detecting all circuits having a plurality of communication paths among the connection devices over the network corresponding to the spanning tree; and applying rapid ring spanning tree protocol (RRSTP) to links corresponding to the detected circuits and applying rapid spanning tree protocol (RSTP) to links not corresponding to the detected circuits.

According to another aspect of the present invention, there is provided an apparatus for determining a communication path over a network. The apparatus includes a spanning tree generator which generates a spanning tree having connection devices over a network as vertices and having links among the connection devices as edges; a vertex information allotter which allots predetermined vertex information to each vertex on the spanning tree; a circuit detector which detects all circuits having a plurality of communication paths among the connection devices over the network corresponding to the spanning tree; and a spanning tree protocol applier which applies RRSTP to links corresponding to the detected circuits and applying RSTP to other links not corresponding to the detected circuits.

BRIEF DESCRIPTION OF THE DRAWINGS

The above and other features and advantages of the present invention will become more apparent by describing in detail exemplary embodiments thereof with reference to the attached drawings in which:

FIG. 2 is a detailed flowchart of an example of a process of generating a spanning tree, shown FIG. 1;

FIG. 3 is a detailed flowchart of an example of a process of allotting a location word to each vertex on a spanning tree, shown in FIG. 1;

FIG. 5 is a detailed flowchart of an example of a process of detecting circuits in a method of determining a communication path over a network according to a preferred embodiment of the present invention;

FIG. 6C is a detailed flowchart of an example of a process of detecting a circuit generated by a link between two adjacent vertices in a method of determining a communication path over a network according to a preferred embodiment of the present invention.

DETAILED DESCRIPTION OF THE INVENTION

Hereinafter, a method of determining a communication path over a network according to a preferred embodiment of the present invention will be described more fully with reference to the accompanying drawings in which preferred embodiments of the invention are shown.

Figure 1:
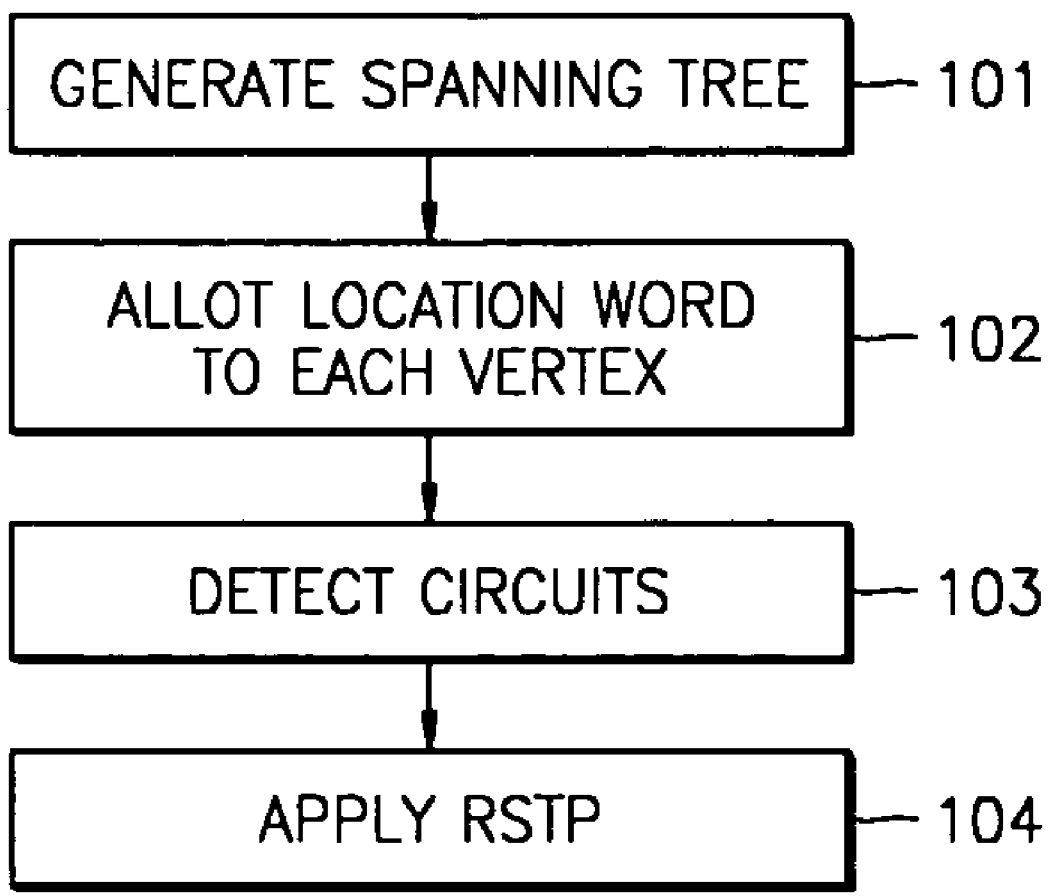
FIG. 1 is a flowchart of a method for determining a communication path over a network according to a preferred embodiment of the present invention.

FIG. 1 is a flowchart of a method of determining a communication path over a network according to a preferred embodiment of the present invention. Referring to FIG. 1, the method involves generating a spanning tree that has connection devices in the network as its vertices and links among the connection devices as its edges (step 101); designating predetermined vertex information for every vertex on the spanning tree (step 102); detecting all circuits, i.e., a plurality number of communication paths among the connection devices over an original network corresponding to the spanning tree (step 103); and applying rapid ring spanning tree protocol (RRSTP) to links that are in the circuits and applying rapid spanning tree protocol (RSTP) to other links that are not in the circuits (step 104).

Determination of communication paths over a network means establishment of paths among connection devices or among bride devices, in particular. A bridge, unlike a repeater or a hub, learns information on from which port to which port network traffic is transferred, while monitoring Ethernet frames. Then, if it knows to which port a network frame input there into should be transferred, the bridge transmits the network frame to a corresponding port based on the learned information. If a network frame having a destination address that is not included in the learned information arrives, the bridge transmits the network frame to all ports. This process is called flooding.

A plurality of communication paths can exist among the connection devices on the network. The plurality of communication paths form a circuit. If flooding occurs on a network where circuits exist, a network frame circulates along the circuits and generates unnecessary network traffic. In this case, the generation of unnecessary network traffic is called bridge looping. STP has been suggested to solve such problem.

STP can be represented by a graph having the connection devices on the network as vertices and links among the connection devices as edges. In the graph, bridge looping generates circuits. Therefore, in order to remove unnecessary loops and connect all the connection devices to one another, a spanning tree needs to be generated, and network traffic needs to be allowed to flow along links included in the spanning tree while not allowed to flow along links not included in the spanning tree by blocking the links not included in the spanning tree. If an error occurs on any link on the spanning tree, a new spanning tree is generated using all the links of the original spanning tree except for the link where the error occurs so that communication paths can be re-established over the network.

Two slightly different methods, i.e., RSTP and RRSTP, have been proposed to solve the problems of STP, including long convergence time and inefficient use of bandwidths.

RSTP has been suggested as an alternative to STP as part of effort to reduce a long convergence time caused by STP. RSTP takes advantage of the fact that vertex-to-vertex links can be more easily restored than shared links. Even when the state of a bridge port changes from a blocking state to a forwarding state, RSTP does not use a long forward timer that is generally used in STP because bridges connected by a vertex-to-vertex link have only two ports whose states might need to be changed. Given the fact that many metropolitan networks are based on vertex-to-vertex links, shorter convergence time provided by RSTP could be considered innovative. In addition, RSTP is compatible with conventional bridges while providing many similar functions to those of STP.

Convergence time achieved by RSTP generally amounts to about 2-3 seconds. However, such short convergence time is still not short enough to meet the requirements of metropolitan networks, such as synchronous optical networks (SONETs). In addition, recently, conventional metropolitan networks have been gradually replaced by metropolitan Ethernet because metropolitan Ethernet is more appropriate for data traffic and has a simpler structure. Metropolitan Ethernet, however, is considered as lacking reliability that has been guaranteed by SONETs. In order to overcome the above-mentioned limitations of RSTP, Riverstone Networks, which is a leading developer of routers and switches, has proposed RRSTP as another alternative to STP.

As described above, Ethernet has a simpler structure and is more appropriate for data traffic. However, Ethernet cannot sufficiently guarantee reliability and bandwidths required in metropolitan networks. Currently, standardization of 10G Ethernet is under way, and Ethernet is expected to replace SONETs in the end. Metropolitan network ring topology is very simple compared to other arbitrary networks, which helps improve the general performance of RSTP.

Riverstone Networks has modified RSTP in order to take advantage of the characteristics of ring topology. In ring topology, rings are identified by their specific ring IDs, and bridge protocol data units (BPDUs) generated in the rings are forced not to be outside the rings, which results in spanning tree for the rings that operate independently of one another.

In the present invention, we take advantage of both RSTP and RRSTP in a manner that respectively applies them to areas when loops exist and when loops do not exist. Therefore, it is possible to improve the performance and efficiency of determining a communication path over a network. For this, the present invention provides a method of determining a communication path over a network, which involves forming a spanning tree (step 101), searching an entire graph for circuits (step 103), and applying RRSTP to areas where circuits exist while applying RSTP to other areas where circuits do not exist (step 104).

More specifically, a spanning tree is generated in step 101. Thereafter, in step 102, location word is allotted to each vertex on the spanning tree. The location word is vertex information representing the hierarchical relationship between a root of the spanning tree and other vertices on the spanning tree and the sibling relationship between vertices under the same sub-root. In step 103, an original network is searched for circuits, i.e., loops, using location word values. In step 104, RRSTP is applied to areas on the spanning tree where circuits exist, and RSTP is applied to other areas on the spanning tree where circuits are removed.

FIG. 2 is a flowchart of a process of generating a spanning tree in a method of determining a communication path over a network according to a preferred embodiment of the present invention. Referring to FIG. 2, all vertices are stored on an untagged vertex list in step 201. In step 202, all links connected to each of the vertices are stored on an untagged edge list for the corresponding vertex. In step 203, one vertex on the untagged vertex list is arbitrarily selected. In step 204, the selected vertex is deleted from the untagged vertex list and then stored on a tagged vertex list. At this time, there is only one vertex stored on the tagged vertex list, while the other vertices are still stored on the untagged vertex list.

Thereafter, edges are continuously included in a spanning tree until all the vertices on the untagged vertex list are transferred onto the tagged vertex list. More specifically, it is checked whether there are vertices still remaining on the untagged vertex list in step 205. In step 206, a link having a smallest weight value and not being on the tagged edge list for each of the vertices on the tagged vertex list is selected from among all the links connected to the corresponding vertex. In step 207, the selected link is stored on the tagged edge list for the corresponding vertex. In step 208, an adjacent vertex connected to the corresponding vertex via the selected link is deleted from the untagged vertex list and is stored on the tagged vertex list. Thereafter, the method returns to step 205, and steps 206 through 208 are repeatedly performed until there is no vertex left on the untagged vertex list. When all the vertices on the untagged vertex list are transferred onto the tagged vertex list, the generation of the spanning tree is complete.

The process of generating a spanning tree, shown in FIG. 2, is based on a conventional spanning tree algorithm. During this process, a tagged value or an untagged value is selectively allotted to each link in order to differentiate links that are removed by generating circuits from links and links that are included in the spanning tree. Here, an untagged value represents a value not accompanied by a tag. In step 202, an untagged value is set as an initial value. In step 207, a tagged value is allotted to each link selected to constitute the spanning tree through a spanning tree algorithm.

One vertex is selected to constitute the spanning tree in steps 203 and 204. A link that has a smallest weight and does not cause a circuit is included in the spanning tree in steps 206 and 207. Between two vertices at either end of the link, the one that is not yet included in the spanning tree is included in the spanning tree in step 208. Steps 206 through 208 are repeatedly performed until all the vertices on the original graph are included in the spanning tree.

FIG. 3 is a detailed flowchart of one example of a process of allotting a location word to each vertex in a method of determining a communication path over a network according to a preferred embodiment of the present invention. Location word is information about a vertex to which it is allotted and generally indicates the relationships between the corresponding vertex and its parent vertex and between the corresponding vertex and its sibling vertices. More specifically, a predetermined vertex corresponding to a root of a spanning tree is selected in step 301. A base location word value, which is an initial location word value, is allotted to the predetermined vertex, i.e., the root vertex, in step 302. Thereafter, among all child vertices of the root vertex, those that are connected by tagged links are selected in step 303. Here, the child vertices of the root vertex represent vertices connected to the root vertex on the spanning tree in a leaf direction, and parent vertices have a smaller location word value than their respective child vertices. In step 304, a new location word value is allotted to each of the selected child vertices. A location word can be obtained using Equation (1) below.

$$\text{Location Word of Child Vertex} = (\text{Location Word of Parent Vertex} * 2^{MAX\_SIBLING}) + \text{sibling\_index} \quad (1)$$

In Equation (1), sibling_index has a value not smaller than a predetermined initial value and not greater than $2^{MAX\_SIBLING-1}$ (step 305).

After designating the selected child vertices as parent vertices, steps 303, 304, and 305 are repeatedly carried out on each of the parent vertices (step 306). Steps 303, 304, 305 and 306 are repeatedly performed until all the vertices of the spanning tree are used as parent vertices (step 307).

Figure 4A:
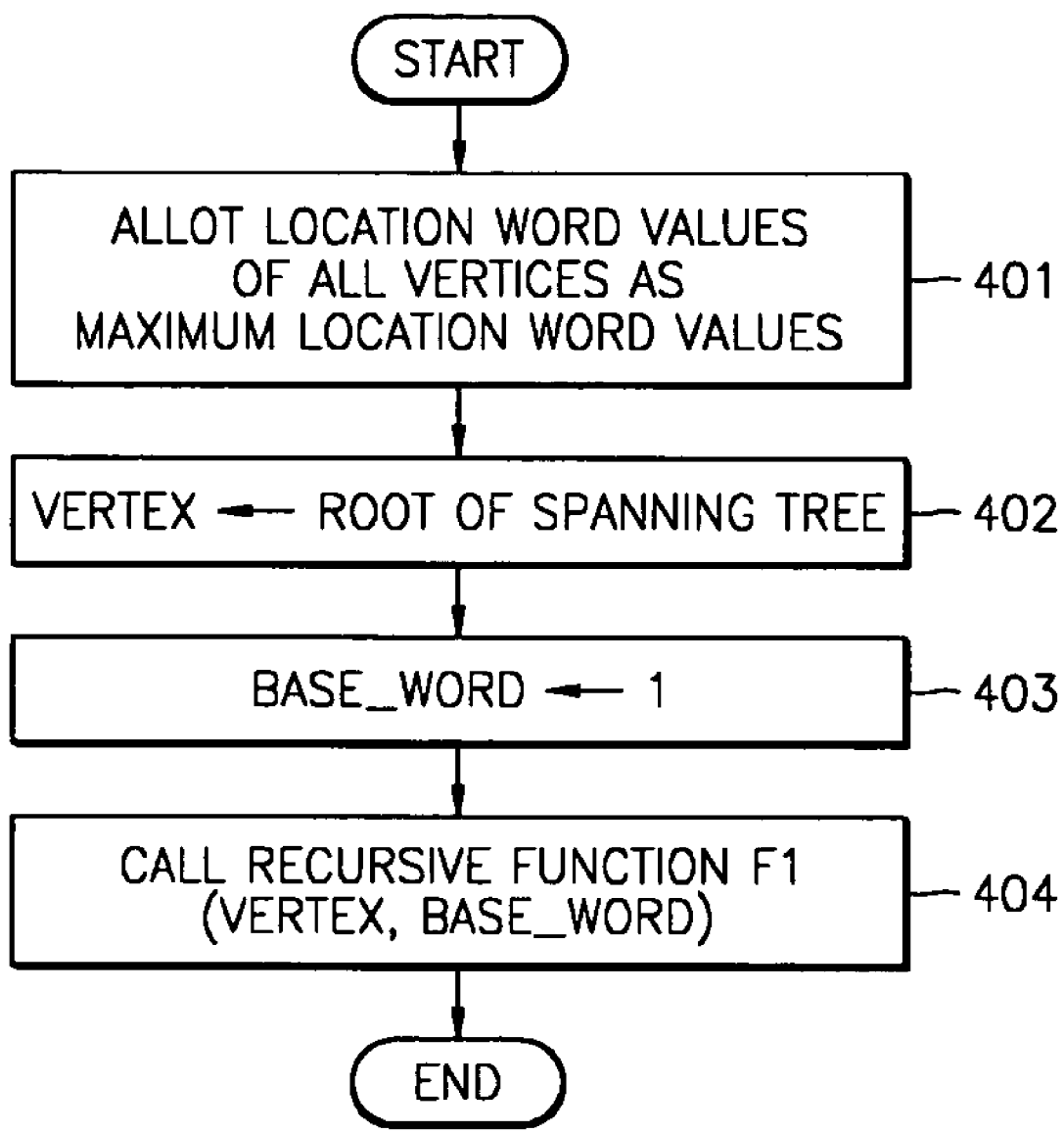
FIGS. 4A and 4B are detailed flowcharts of other examples of the process of allotting a location word to each vertex on a spanning tree in a method of determining a communication path over a network according to a preferred embodiment of the present invention.

FIG. 4A is a detailed flowchart of another example of a process of allotting location word to each vertex in a method of determining a communication path over a network according to a preferred embodiment of the present invention.

Referring to FIG. 4A, location word values of all vertices are set as maximum location words in step 401. Thereafter, in step 402, the root vertex of a spanning tree is selected as a variable VERTEX. A variable BASE_WORD, which represents a base word value, is set to 1 in step 403. A recursive function F1(VERTEX, BASE_WORD) is called in step 404.

Figure 4B:
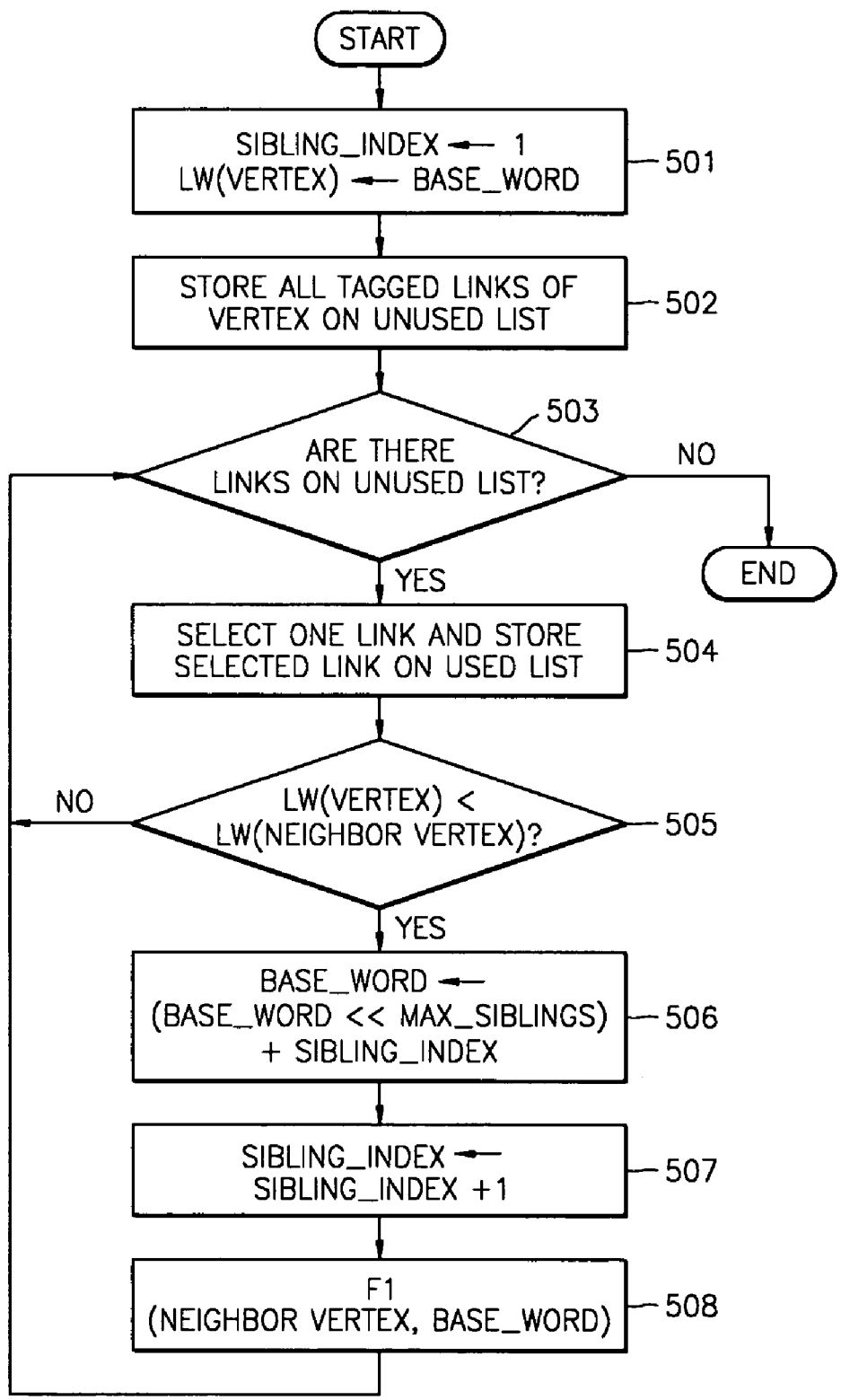

FIG. 4B is a detailed flowchart of the recursive function F1 called in step 404. In step 501, a variable SIBLING_INDEX is set to 1, and the value of the variable BASE_WORD when the recursive function F1 is called is designated to a location word value of VERTEX. In step 502, all tagged links are copied to an unused list.

In step 503, it is checked whether there are links on the unused list. If there is no link on the unused list, the recursive function F1 is completed. Otherwise, one link is selected from among those on the unused list and then is stored on a used list in step 504. The location word value of VERTEX is compared with a location word value of a neighbor vertex of VERTEX in step 505. If the location word value of VERTEX is not smaller than the location word value of the neighbor vertex, steps 503 through 505 are repeated. Otherwise, the value of BASE_WORD is shifted leftward by as much as a value of MAX_SIBLING, sibling_index is added to the shift result, and the result is newly set as BASE_WORD in step 506. Thereafter, in step 507, sibling_index increases by 1. In step 508, the recursive function F1 calls itself using a neighbour vertex and BASE_WORD as parameters. After the recursive calling, the process returns to step 503, and steps 503 through 508 are repeatedly carried out for all the links on the unused list. Then, the allocation of a location word to each of the vertices is complete.

FIG. 5 is a detailed flowchart of an example of a process of detecting circuits in a method of determining a communication path over a network according to a preferred embodiment of the present invention. Referring to FIG. 5, a root vertex of a spanning tree is selected as an ancestor vertex in step 601. Among all child vertices of the ancestor vertex, the one that is connected to the ancestor vertex by a link that is not included in the spanning tree is selected in step 602. The common ancestor vertex shared by the selected child vertex and the ancestor vertex is searched for using location word values of the ancestor vertex and the child vertex in step 603. A circuit including a plurality of communication paths between the ancestor vertex and the selected child vertex is detected using a location word value of the common ancestor in step 604. Steps 602 through 604 are repeatedly carried out upon the child vertices of the ancestor vertex other than the selected ones in step 605. Steps 602 through 605 are repeatedly performed in step 606 until all the vertices of the spanning tree are used as ancestor vertices.

During the above-mentioned process, a circuit is detected using location word values of two vertices connected by an untagged link. More specifically, the ancestor vertex, which corresponds to the root of the spanning tree, is determined in step 601. Here, the ancestor vertex corresponds to, between the two vertices, the one that is located higher on the spanning tree than the other. In step 602, one of the child vertices connected to the ancestor vertex by untagged links is selected from among all the child vertices of the ancestor vertex. In step 603, the common ancestor vertex shared by the selected child vertex and the ancestor vertex is searched using the location word values of the ancestor vertex and the selected child vertex. In step 604, a circuit is detected using the location word values of the ancestor vertex, the selected child vertex, and the common ancestor vertex. Then steps 602 through 604 are repeated using the selected child vertex as a new ancestor vertex in step 605. This process is repeated (in step 606) until all vertices on the spanning tree are used as ancestor vertices.

Figure 6A:
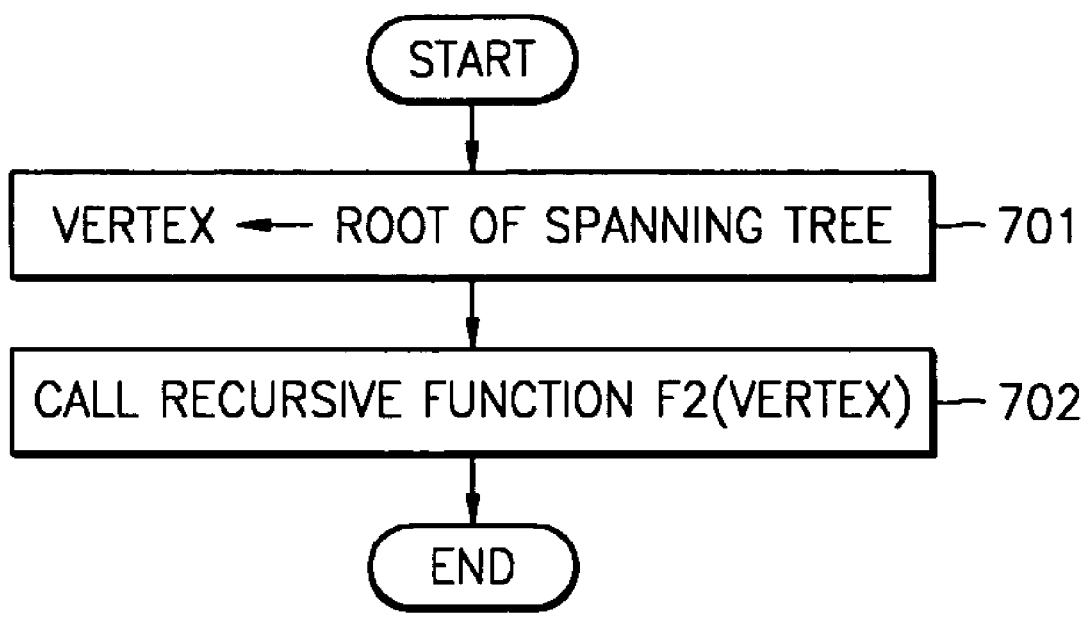
FIGS. 6A and 6B are detailed flowcharts of other examples of the process of detecting circuits in a method of determining a communication path over a network according to a preferred embodiment of the present invention.

FIG. 6A is a detailed flowchart of another example of a process of detecting a circuit in a method of determining a communication path over a network according to a preferred embodiment of the present invention.

Referring to FIG. 6A, a root vertex of a spanning tree is designated as a variable VERTEX in step 701, and the recursive function F2(VERTEX) is called in step 702.

Figure 6B:
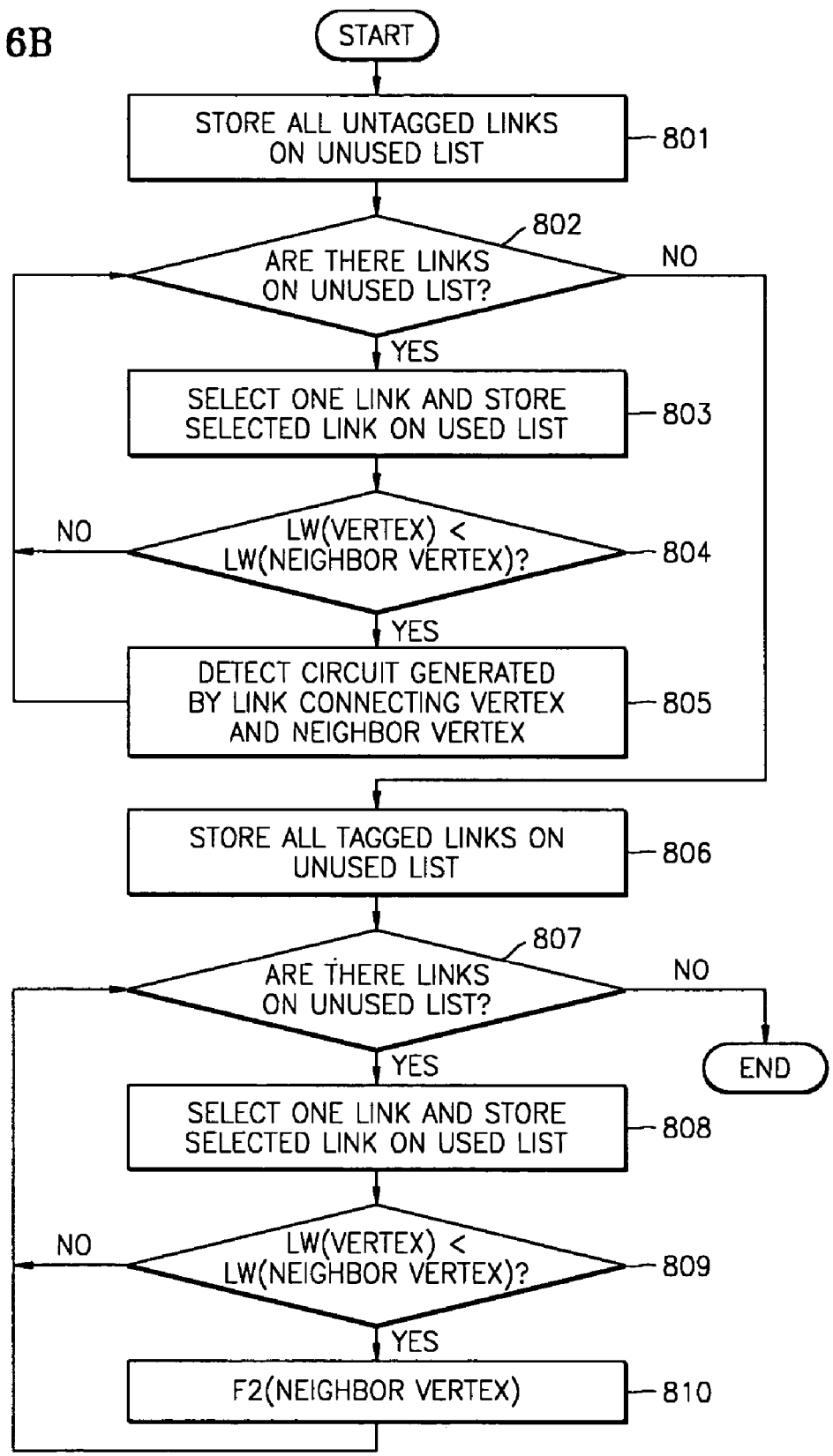

FIG. 6B is a detailed flowchart of the recursive function F2 in step 702. All untagged links connecting VERTEX are copied to an unused list in step 801. It is checked whether there are links on the unused list in step 802. If there is no link on the unused list, the process proceeds to step 806.

Otherwise, if there are links on the unused list, one of the links on the unused list is selected and then is moved to the used list in step 803. A location word value of VERTEX is compared with a location word value of a neighbor vertex of VERTEX in step 804. If the location word value of VERTEX is not smaller than the location word value of the neighbor vertex, the process returns to step 802. Otherwise, a circuit generated by a link connecting VERTEX and the neighbor vertex is detected in step 805. Then the process returns to step 802, and steps 803 through 805 are repeated until there is no link left on the unused list.

After steps 803 through 805 are carried out upon all the links on the unused list, all tagged links are stored on the unused list in step 806. It is checked whether there are links on the unused list in step 807. One of the links on the unused list is moved to the used list in step 808. A location word value of VERTEX is compared with the location word value of the neighbor vertex of VERTEX in step 809. If the location word value of VERTEX is not smaller than the location word value of the neighbour vertex, the process returns to step 807. Otherwise, the recursive function F2 having the neighbor vertex as a parameter is called in step 810. All circuits over a network can be detected by carrying out the above-described process on all the links on the unused list.

Hereinafter, step 805 in which the circuit generated by the link between VERTEX and its neighbour vertex is detected will be described in greater detail with reference to FIG. 6C. FIG. 6C is a detailed flowchart of an example of a process of detecting a link generated by a link between adjacent vertices in a method of determining a communication path over a network according to a preferred embodiment of the present invention. Referring to FIG. 6C, a common ancestor of VERTEX and its neighbour vertex in a spanning tree is searched for using location word values of VERTEX and its neighbor vertex in step 901 by searching for a vertex having the same bit values in as many bits as an integer multiple of MAX_SIBLING in a downward direction from a most significant bit (MSB) to a least significant bit (LSB).

Thereafter, in step 902, all vertices on a communication path between VERTEX and the root vertex are detected using the location word values of VERTEX and the root vertex. In step 903, all vertices on a communication path between the neighbor vertex of VERTEX and the root vertex are detected using the location word values of the neighbor vertex and the root vertex.

FIGS. 7A through 7F are diagrams illustrating the results of executing application programs to which a method of determining a communication path over a network according to a preferred embodiment is applied.

Figure 7A:
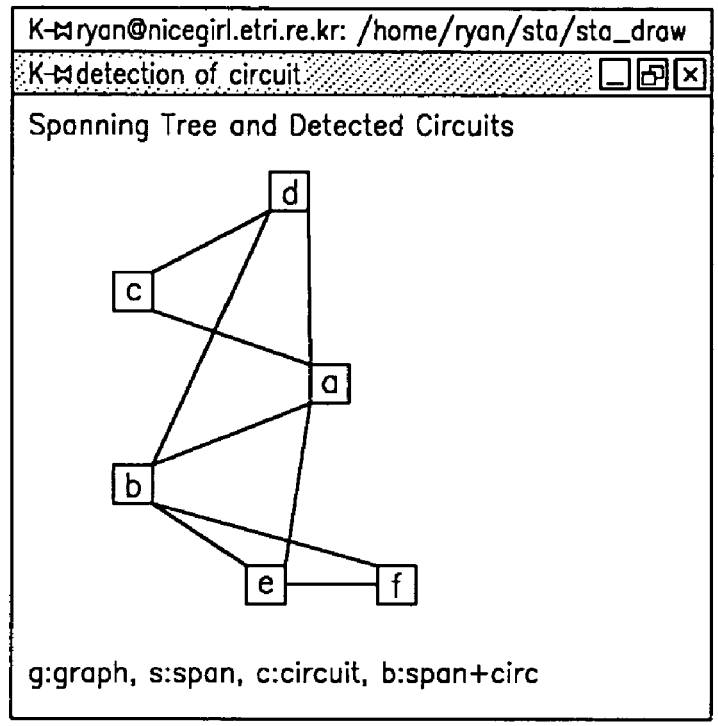
FIGS. 7A through 7F are diagrams illustrating the results of executing an application program enabling a method of determining a communication path over a network according to a preferred embodiment of the present invention.
Figure 7B:
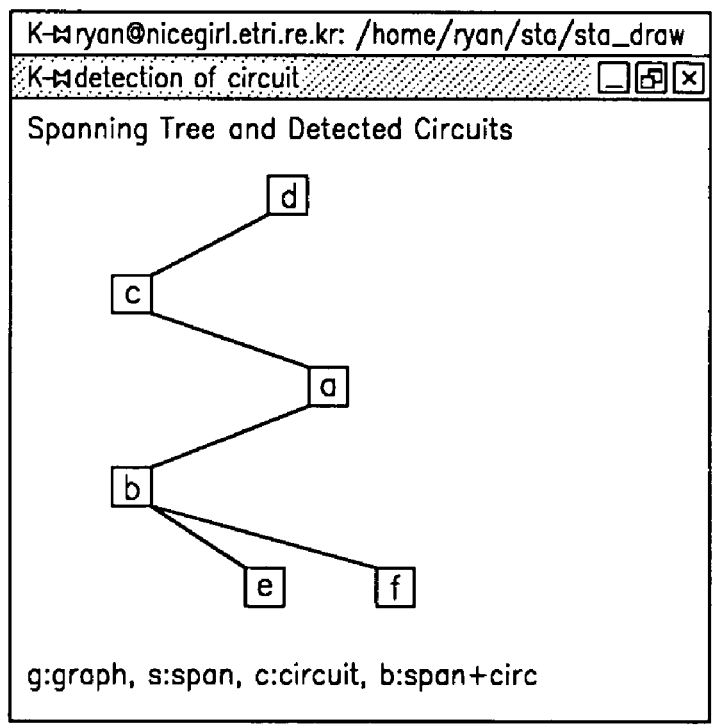
Figure 7C:
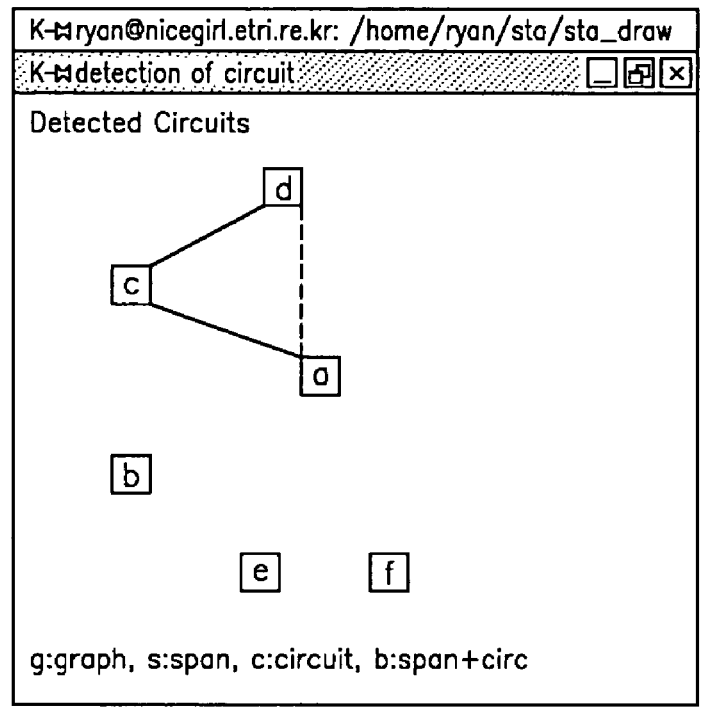

FIG. 7A illustrates a graph including vertices a, b, c, d, e, and f. FIG. 7B illustrates a spanning tree having the vertex d as a seed vertex. FIGS. 7C through 7F illustrate circuits detected according to the present invention. In FIG. 7C, a link between the vertices d and a is blocked, and RSSTP is applied to a circuit comprised of links between d and c, between c and a, and between a and d.

Figure 7D:
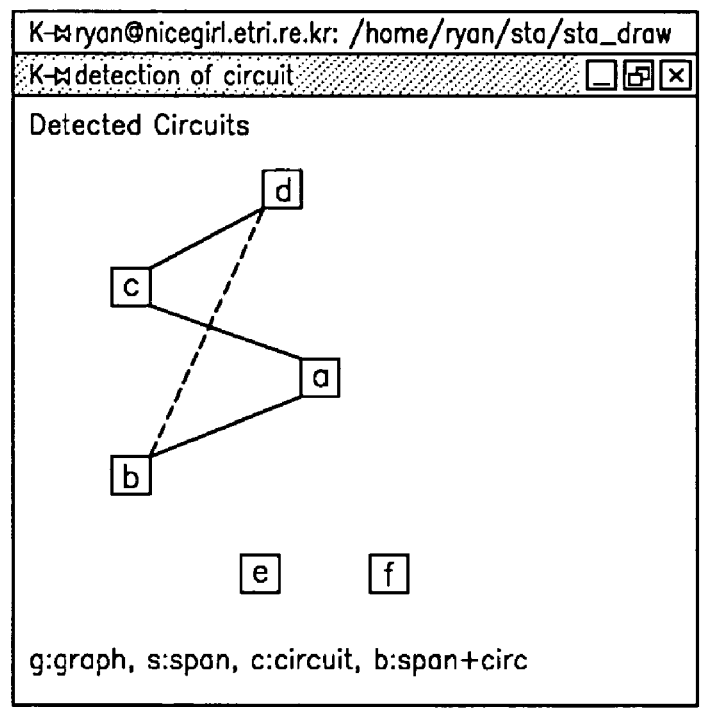

In FIG. 7D, a link between d and b is blocked, and RRSTP is applied to a circuit comprised of links between d and c, between c and a, between a and b, and between b and d.

Figure 7E:
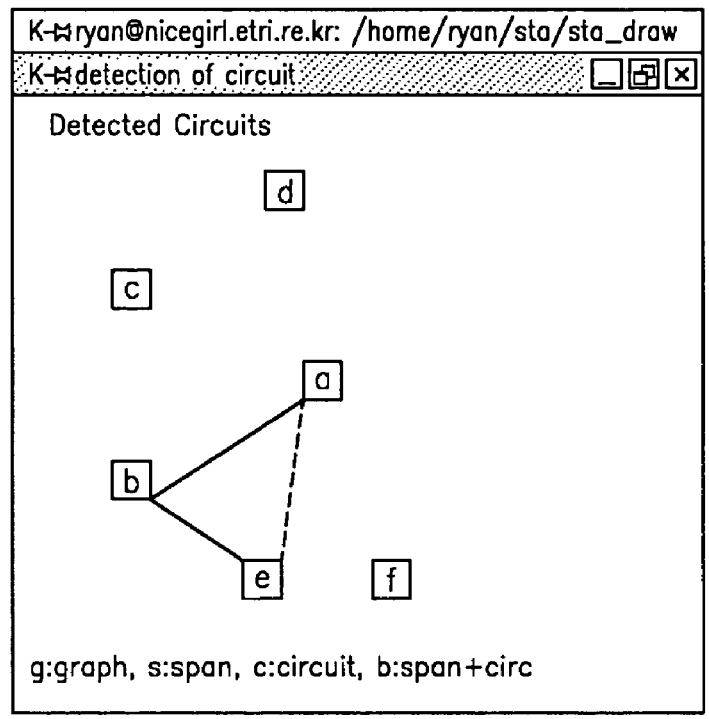

In FIG. 7E, a link between a and e is blocked, and RRSTP is applied to a circuit comprised of links between a and e, between e and b, and between b and a.

Figure 7F:
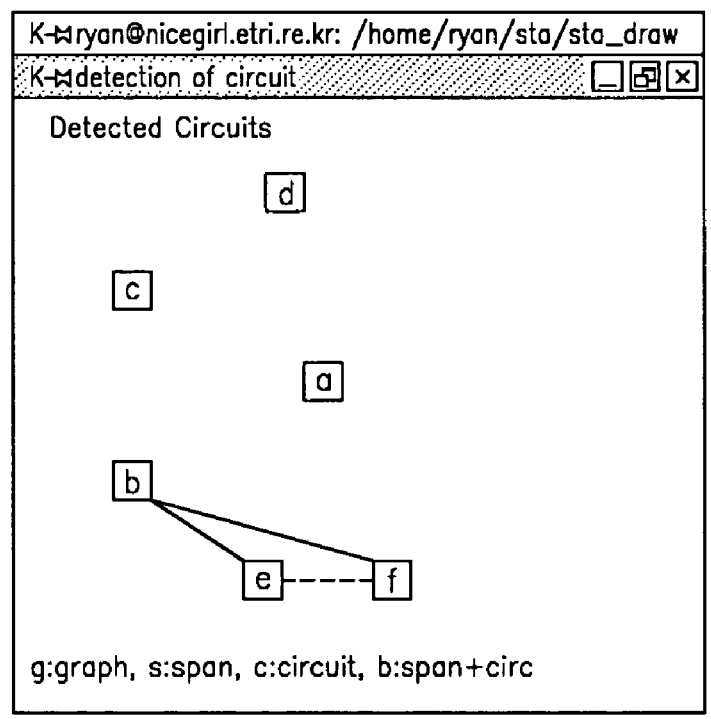

In FIG. 7F, a link between e and f is blocked, and RRSTP is applied to a circuit comprised of links between e and f, between f and b, and between b and e.

The present invention can be realized as computer-readable codes written on a computer-readable recording medium. The computer-readable recording medium includes all kinds of recording media in which data can be stored in a computer-readable manner. For example, the computer-readable recording medium includes ROM, RAM, CD-ROM, a magnetic tape, a floppy disk, and an optical data storage.

As described above, in the present invention, different protocols are applied to areas where loops exist and other areas where loops do not exist by using a spanning tree and circuit detection. Therefore, RRSTP can be applied to even a topology to which RRSTP used to be unable to be applied, by conditionally analyzing and restructuring the topology. In addition, it is possible to reduce convergence time more considerably than in the prior art that only adopts RSTP.

What is claimed is:

1. A method of determining a communication path over a network, the method comprising:
   (a) generating a spanning tree having connection devices over a network as vertices and having links among the connection devices as edges;
   (b) allotting predetermined vertex information to each vertex on the spanning tree;
   (c) detecting all circuits having a plurality of communication paths among the connection devices over the network corresponding to the spanning tree; and
   (d) applying rapid ring spanning tree protocol (RRSTP) to links corresponding to the detected circuits and applying rapid spanning tree protocol (RSTP) to links not corresponding to the detected circuits.

2. The method of claim 1, wherein (a) comprises:
   (a1) selecting one vertex and including the selected vertex in the spanning tree;
   (a2) selecting a link having a smallest weight among all the links attached to vertices on the spanning tree, and including the selected link in the spanning tree;
   (a3) including the other vertex of the selected link that is yet to be included in the spanning tree in the spanning tree; and
   (a4) repeatedly carrying out (a2) and (a3) until all vertices are included in the spanning tree.

3. The method of claim 1, wherein (a) comprises:
   (a1) storing the vertices on a predetermined untagged vertex list;
   (a2) storing all links attached to each of the vertices on a predetermined untagged edge list for the corresponding vertex;
   (a3) arbitrarily selecting and deleting one vertex from the untagged vertex list and storing the selected vertex on a predetermined tagged vertex list;
   (a4) selecting a link that has a smallest weight and does not exist on the tagged edge list for a corresponding vertex on the tagged vertex list from among all the links attached to the vertices on the tagged vertex list;

(a5) storing the selected link on a tagged edge list for the corresponding vertex;

(a6) deleting a neighbor vertex connected to the corresponding vertex via the selected link from the untagged vertex list and storing the neighbor vertex on the tagged vertex list; and (a7) repeatedly carrying out steps (a4) through (a6) until no vertex remains on the untagged vertex list.

4. The method of claim 1, wherein (b) comprises:

(b1) selecting a root vertex of the spanning tree as a parent vertex;

(b2) allotting predetermined vertex information to the parent vertex;

(b3) selecting child vertices of the selected parent vertex that are connected to the parent vertex by links included in the spanning tree from among all child vertices of the parent vertex on the spanning tree; and (b4) repeatedly carrying out steps (b2) and (b3) until all the vertices on the spanning tree are selected as parent vertices.

5. The method of claim 4, wherein vertex information of a root vertex has an initial value, vertex information of other vertices has a value obtained by shifting their parent vertices' vertex information value leftward by as much as a predetermined number of bits and adding a predetermined index value to the shift result, and the index value is increased by 1 whenever the vertex is selected.

6. The method of claim 1, wherein (c) comprises:

(c1) selecting the root vertex of the spanning tree as an ancestor vertex;

(c2) selecting child vertices of the ancestor vertex that are connected to the ancestor vertex by links not included in the spanning tree;

(c3) searching the spanning tree for a common ancestor vertex shared by the ancestor vertex and the selected child vertices using location word values of the selected vertices and the ancestor vertex;

(c4) detecting a circuit having a plurality of communication paths between the ancestor vertex and the selected child vertices using a location word value of the common ancestor vertex;

(c5) repeatedly carrying out steps (c3) and (c4) on other child vertices of the ancestor vertex; and (c6) repeatedly carrying out steps (c2) through (c5) while sequentially selecting each of the vertices on the spanning tree as an ancestor vertex.

7. An apparatus for determining a communication path over a network, the apparatus comprising:

a spanning tree generator which generates a spanning tree having connection devices over a network as vertices and having links among the connection devices as edges;

a vertex information allotter which allots predetermined vertex information to each vertex on the spanning tree;

a circuit detector which detects all circuits having a plurality of communication paths among the connection devices over the network corresponding to the spanning tree; and a spanning tree protocol applier which applies RRSTP to links corresponding to the detected circuits and applying RSTP to other links not corresponding to the detected circuits.

8. A computer-readable recording medium on which a program enabling a method of determining a communication path over a network is recorded, wherein the method comprises:

(a) generating a spanning tree having connection devices over a network as vertices and having links among the connection devices as edges;

(b) allotting predetermined vertex information to each vertex on the spanning tree;

(c) detecting all circuits having a plurality of communication paths among the connection devices over the network corresponding to the spanning tree; and (d) applying rapid ring spanning tree protocol (RRSTP) to links corresponding to the detected circuits and applying rapid spanning tree protocol to other links not corresponding to the detected circuits.

* * * * *